Patented Mar. 26, 1929.

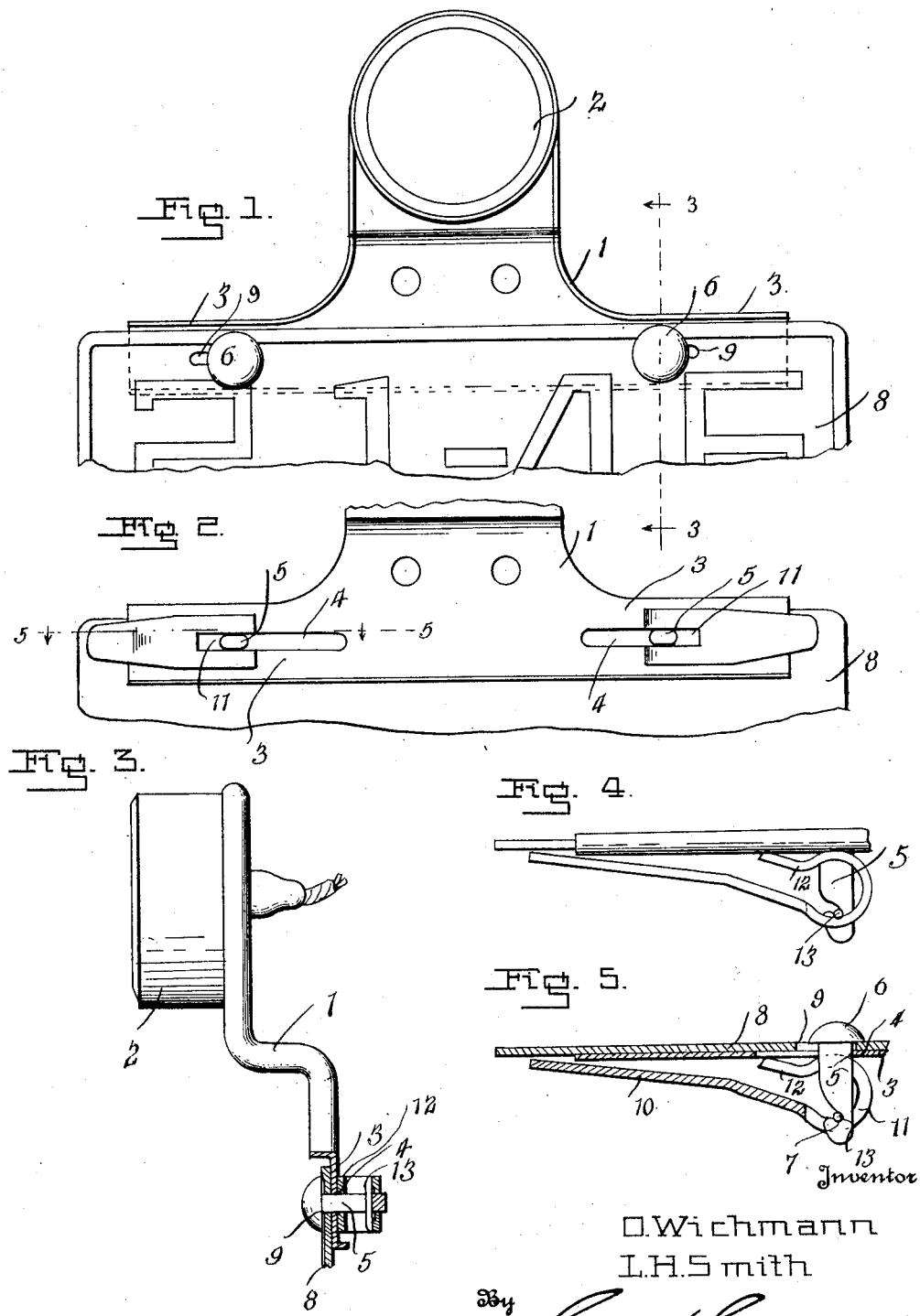

1,706,761

UNITED STATES PATENT OFFICE.

OTTO WICHMANN AND LAWRENCE H. SMITH, OF ANCHOR, ILLINOIS.

FASTENER FOR AUTOMOBILE LICENSE PLATES.

Application filed July 8, 1927. Serial No. 204,342.

The present invention is directed to improvements in fasteners for automobile license plates.

The primary object of the invention is to provide a device of this character so constructed that an old license plate can be easily and quickly removed from the supporting bracket and a new one substituted therefor, without the use of tools.

Another object of the invention is to provide a device of this character which is so constructed that the clamping levers for maintaining the license plate yieldably engaged with the supporting bracket can be easily and quickly manipulated to either release the license plate or secure the same firmly in place upon the bracket.

In the accompanying drawing:

Figure 1 is a front view of the bracket showing a license plate secured thereto.

Figure 2 is a fragmentary rear elevation of the same.

Figure 3 is a sectional view on line 3—3 of Figure 1.

Figure 4 is a fragmentary top plan view.

Figure 5 is a sectional view on line 5—5 of Figure 2.

Referring to the drawing, 1 designates a bracket which supports the conventional tail lamp 2, said bracket being adapted, as customary to be secured to a part of the automobile. This bracket includes a pair of lateral arms 3 having longitudinal slots 4 formed therein and through which are passed the shanks 5 of the clamping bolts 6. The bolt shanks are rectangular in cross section, but it will be of course understood that they may be of different shape if desired.

These shanks are provided with notches 7, the purpose of which will be later explained.

The license plate is designated by the numeral 8 and is provided with slots 9 adapted to be placed in registration with the slots 4 of the arms 3, the shanks of the bolts being also engaged in the slots 9, as clearly shown in Figure 5.

Cooperating with the bolts 6 for holding the license plate firmly connected with the arms 3 of the bracket are levers 10, said levers being slotted, as at 11, to provide resilient cam arms 12, there being bars 13 supported by the arms 12 for detachable engagement with the notches 7 of the shanks, as more clearly illustrated in Figures 4 and 5 of the drawing.

It will be obvious that when the levers 10 are closed or in clamping positions, that the cam arms 12 will be compelled to flex slightly when engaged with the arms 3 owing to the fact that the bars 13 are engaged in the notches 7, whereby the arms will yieldably engage the arms 3 and hold the license plate firmly in place.

To remove the license plate it is often necessary to swing the levers 11 outwardly, whereupon the arms 12 will be shifted to a position to permit the bars 13 to disengage the notches 7, thereby releasing the bolts 6 in order that the license plate can be removed and a new one substituted therefor.

Having thus described the invention, we claim:

1. The combination with a bracket having a license plate engaged therewith, a bolt passing through the bracket and license plate, a lever having resilient cam arms carried thereby, means carried by the arms for pivotally and detachably connecting the lever with the bolt, said cam arms being adapted to yieldably engage the bracket, as and for the purpose set forth.

2. The combination with a bracket, of a license plate engaged therewith, a bolt passable through the bracket and license plate and having its shank provided with a notch, a lever, cam arms carried by the lever, a bar carried by the arms for pivotally and detachably engaging said notch, said arms being adapted to yieldably engage the bracket, as and for the purpose set forth.

3. The combination with a bracket, of a license plate engaged therewith, a bolt passable through the bracket and license plate and having its shank provided with a notch, a lever, spaced resilient arms carried by the lever, a bar bracing the space between the arms and secured to said arms, said bar being adapted to detachably and pivotally engage said notch to hold said arms yieldably engaged with the bracket when the lever is in its operative or closed position.

In testimony whereof we affix our signatures.

OTTO WICHMANN. [L. S.]
LAWRENCE H. SMITH. [L. S.]